United States Patent
Manuel

(10) Patent No.: US 12,308,628 B2
(45) Date of Patent: May 20, 2025

(54) METHODS AND APPARATUS FOR PROTECTING ELECTRICAL BOXES

(71) Applicant: Fred Manuel, Modesto, CA (US)

(72) Inventor: Fred Manuel, Modesto, CA (US)

( * ) Notice: Subject to any disclaimer, the term of this patent is extended or adjusted under 35 U.S.C. 154(b) by 259 days.

(21) Appl. No.: 18/146,985

(22) Filed: Dec. 27, 2022

(65) Prior Publication Data

US 2024/0039259 A1    Feb. 1, 2024

Related U.S. Application Data

(63) Continuation-in-part of application No. 29/848,101, filed on Jul. 29, 2022, now Pat. No. Des. 1,032,347.

(51) Int. Cl.
| | | |
|---|---|---|
| *H02G 3/08* | (2006.01) | |
| *H02G 3/10* | (2006.01) | |
| *H02G 3/12* | (2006.01) | |

(52) U.S. Cl.
CPC .............. *H02G 3/081* (2013.01); *H02G 3/10* (2013.01)

(58) Field of Classification Search
CPC ........... H02G 3/10; H02G 3/126; H02G 3/081
See application file for complete search history.

(56) References Cited

U.S. PATENT DOCUMENTS

| | | | |
|---|---|---|---|
| 5,810,303 | A | 9/1998 | Bourassa et al. |
| 7,472,970 | B2 | 1/2009 | Bergesch et al. |
| 7,544,889 | B1 | 6/2009 | Sanchez |
| 9,732,518 | B2 | 8/2017 | Croasdale et al. |
| 10,069,288 | B1 * | 9/2018 | Link .................. E04B 2/7457 |
| 2011/0001026 | A1 | 1/2011 | Kubsad et al. |

OTHER PUBLICATIONS

Fasteners Plus, Simpson PSPN58Z Protecting Shield Plate—ZMAX, retrieved on Jan. 16, 2024, Online: "https://www.fastenersplus.com/products/simpson-pspn58z-protecting-shield-plate-zmax?utm_term=&utm_campaign=%23z+Shopping+-+Simpson+Connectors+-+Holdowns+%26+Tension+Ties&utm_%E2%80%A6".

Fasteners Plus, Simpson PSPN516Z Protecting Shield Plate—ZMAX, retrieved on Jan. 16, 2024, Online: "https://www.fastenersplus.com/products/simpson-pspn516z-protecting-shield-plate-zmax?utm_term=&utm_campaign=%23z+Shopping+-+Simpson+Connectors+-+Holdowns+%26+Tension+Ties&utm%E2%80%A6".

Lowe's, Simpson Strong-Tie 2-in x 4-in 12-Gauge Galvanized Steel Angle, retrieved on Jan. 16, 2024, Online: "https://www.lowes.com/pd/Simpson-Strong-Tie-Wood-to-Wood-Angle/3083381".

(Continued)

*Primary Examiner* — Timothy J Thompson
*Assistant Examiner* — Amol H Patel
(74) *Attorney, Agent, or Firm* — Sierra IP Law, PC; Mark D. Miller

(57) ABSTRACT

The present invention provides methods and apparatus for protecting the contents of electrical boxes installed in new or existing buildings before sheetrock, drywall or wallboard is installed, by providing sturdy L-shaped brackets that include at least one insertion flange and a base plate. The flange portions of the bracket may be easily inserted (or removed) between the electrical box and the frame member to which the box is mounted, such that after insertion of the flange, the back of the box is covered and protected by the base plate. After the bracket has been installed, sheetrock, drywall or wallboard behind the electrical box may then be completed. The base plate of the bracket protects the back of the electrical box from inadvertent punctures that could occur since the location of the back of the box may not be easily determined after the wall is completed.

18 Claims, 18 Drawing Sheets

(56) References Cited

OTHER PUBLICATIONS

Lowe's, Simpson Strong-Tie 3-in x 1-1/2-in 14-Gauge Galvanized Nail Plates, retrieved on Jan. 16, 2024, Online: "https://www.lowes.com/pd/Simpson-Strong-Tie-NS-1-1-2-in-x-3-in-16-Gauge-Nail-Stop/1002681392?cm_mmc=shp-_-b-_-prd-_-bdm-_-ggl-_-LIA_BDM_000_PRO-_-1002681392-_-local-_-0-_-0&gad_s%E2%80%A6".

Lowe's, Simpson Strong-Tie 6-in x 1-1/2-in 14-Gauge Galvanized Nail Plates, retrieved on Jan. 16, 2024, Online: "https://www.lowes.com/pd/Simpson-Strong-Tie-NS-1-1-2-in-x-6-in-16-Gauge-Nail-Stop/1002681560?cm_mmc=shp-_-b-_-prd-_-bdm-_-ggl-_-LIA_BDM_000_PRO-_-1002681560-_-local-_-0-_-0&gad_s%E2%80%A6".

Zoro, Simpson Strong-Tie 112x3 Nail Stop, Retrieved on Jan. 16, 2024, Online: "https://www.zoro.com/simpson-strong-tie-112x3-nail-stop-ns1/i/G908211635/?utm_source=google&utm_medium=surfaces&utm_campaign=shop%E2%80%A6".

Zoro, Simpson Strong-Tie Nail Protection Plate, Retrieved on Jan. 16, 2024, Online: "https://www.zoro.com/simpson-strong-tie-nail-protection-plate-pspn516z/i/G408239917/?utm_source=google&utm_medium=surfaces&utm_camp%E2%80%A6".

Fasteners Plus, Simpson TPA575 5" X 7" Flanged Tie Plate—G90 Galvanized, Jan. 16, 2024, Online: "https://www.fastenersplus.com/products/simpson-tpa57-5-x-7-flanged-tie-plate".

* cited by examiner

US 12,308,628 B2

METHODS AND APPARATUS FOR PROTECTING ELECTRICAL BOXES

CROSS-REFERENCE TO RELATED APPLICATIONS

This is a continuation-in-part of U.S. patent application Ser. No. 29/848,101 filed on Jul. 29, 2022 which is incorporated herein by this reference in its entirety.

FIELD OF THE INVENTION

The present invention relates to installation of electrical systems in walls of new or existing buildings or structures, and more particularly to methods and apparatus for protecting the contents of electrical boxes installed in walls of new or existing buildings from post-installation damage from nails or other objects puncturing the walls.

BACKGROUND OF THE INVENTION

In the construction of new or existing buildings, electrical wiring is ordinarily installed in the walls of the building after the wall frames have been erected but before wallboard covering is attached. As part of the electrical wiring process, boxes for holding switches, sockets, dimmers or other electrical components are attached to studs or wall frame members, and electrical wiring is run to each box. A typical electrical box will generally include an open front, a closed back, a top, a bottom, and left and right sides. In a typical installation, one of the sides of the box may be attached to a vertical stud or wall frame member. The open front of the box is designed to receive a fixture such as a switch, socket, dimmer or other electrical component and wiring to the box provides power to the fixture.

In typical construction, after the electrical boxes and wiring have been installed on the wall frames, sheetrock, drywall or wallboard is attached to the frame members to close up the wall. Openings are cut in the wall board for the fronts of the electrical boxes so that they may be accessed for later installation of a fixture. Then, after the fixture is installed and the wall is finished and painted, a decorative cover plate is typically placed over the fixture on the exterior surface of the wall to hide the interior wires while allowing access to the switch, socket, dimmer or other component. The face plate and fixture make it easy to locate the front of the electrical box to avoid damaging it with nails pounded into the wall.

However there is ordinarily no visual indicator of the location of the back of the same electrical box on an opposite wall. This poses a danger of damage to the electrical box and/or a danger of electrocution from inadvertent puncture of the electrical box from the back resulting from the use of a nail, screw, drill, screwdriver or other tool. In response, some electrical boxes are made of metal in order to withstand inadvertent punctures from nails, screws, drills or the like. However, if the electrical box is made of plastic, the puncture danger remains.

It is therefore desirable to provide methods and apparatus for protecting the backs of installed electrical boxes from damage or injury resulting from inadvertent punctures.

SUMMARY OF THE INVENTION

The present invention provides methods and apparatus for protecting the contents of electrical boxes installed in new or existing buildings before sheetrock, drywall or wallboard is installed, by providing sturdy L-shaped brackets that include at least one insertion flange and a base plate in which the flange(s) may be easily inserted (or removed) between the electrical box and the frame member to which the box is mounted, such that after insertion of the flange, the back of the box is covered and protected by the base plate. After the bracket has been installed, sheetrock, drywall or wallboard behind the electrical box may then be completed. The base plate of the bracket protects the back of the electrical box from inadvertent punctures that could occur since the location of the back of the box may not be easily determined after the wall is completed.

Most embodiments of the brackets of the present invention are provided as a single integrated piece that may be made of metal or a similar sturdy material. In some embodiments, the metal may be 16 gauge steel. In other embodiments the base plate and flange(s) portions of the bracket may be separate parts that are attached together (e.g., welded, fused, etc.) to form a single unit. In such embodiments, the base plate and flange(s) portions of the bracket may be made of different materials that are suitable for attachment together. For example and without limitation, the base plate portion may be made of metal and the flange portion may be made of plastic that is fused to an edge of the base plate to form a single unit. In all embodiments, the base plate should be strong and/or thick enough to prevent nails, drills, screws or other objects from puncturing the electrical box.

The base plate portion of the bracket should be shaped to cover the back of the electrical box, it being understood that different sized brackets will be needed for different sized electrical boxes. For example and without limitation, a narrow base plate would sufficient for a single component electrical box, but a wider base plate would be needed for larger electrical boxes with multiple components.

The flange portion of the bracket may be comprised or one or more flanges which are positioned so as not to make contact with the mounting hardware (e.g., nails or screws) that hold the electrical box to the frame member when the flange is inserted between the electrical box and the frame member. For example and without limitation some embodiments of the present invention may include a single flange having a shortened longitudinal length that fits between the mounting hardware (such as nails or screws) holding the electrical box to the frame; some embodiments may include multiple flanges that fit between such mounting hardware; some embodiments may include a single shallow flange extending the length of the bracket to avoid the mounting hardware; some embodiments may include a single flange extending the length of the bracket having indentations and/or recesses therein to accommodate for the mounting hardware; and some embodiments may include different combinations of any of the above.

In some embodiments of the present invention, the flange portion(s) of bracket may include one or more openings through which mounting hardware (such as nails or screws) may be received to firmly attach the bracket to a wall frame member. These embodiments may also include the mounting hardware as well.

In use, an electrical box is first attached to a wall frame member using mounting members such as screws or nails. An embodiment of a bracket of the present invention is then selected having a base that is of sufficient size to cover the back of the box, and at least one flange for insertion between the electrical box and the frame member. The flange should be selected so as not to make contact with the mounting members when inserted in the space between the mounted electrical box and the frame member. For example, and without limitation, the flange may have a shape that fits between the mounting members, or multiple flanges may be present that fit between the mounting members, or a single flange may be provided having gaps to accommodate the positions of the mounting members, and/or the flange may have a shallow width that does not contact the mounting members.

Once a bracket having an appropriately sized base and appropriately shaped flange(s) are selected, the flange(s) may then be inserted in the space(s) between the electrical box and the frame member such that the base rests against the back of the electrical box. Ordinarily, there is a tight space between the electrical box and the frame member that provides sufficient friction to hold the flange securely in place. However, in some situations there may be a gap between the electrical box and the frame member. In these situations, an alternative embodiment may be selected in which the flange(s) are provided with one or more openings through which mounting hardware (such as screws or nails) may be used to engage and secure the flange to the frame, with the base plate behind the electrical box. Once the selected bracket has been installed, the sheetrock, drywall or wallboard may then be installed behind the electrical box.

It is therefore an object of the present invention to improve safety and prevent damage or injury by providing methods and apparatus for protecting the backs of electrical boxes from punctures.

It is also an object of the present invention to provide protective brackets that may be easily and securely installed over the backs of electrical boxes during construction to prevent the boxes from being punctured.

It is also an object of the present invention to provide methods for easily and securely installing protective brackets over the backs of electrical boxes during construction to prevent the boxes from being later being punctured.

It is also an object of the present invention to provide protective brackets for installation over the backs of electrical boxes during construction having flanges thereon that fit between the electrical box and the wall frame member to which the box is attached, and may be attached to the wall frame member, such that the flanges do not interfere with the mounting hardware holding the electrical box to the wall frame member.

Additional objects of the invention will be apparent from the detailed descriptions and the claims herein.

DETAILED DESCRIPTION

Figure 1:
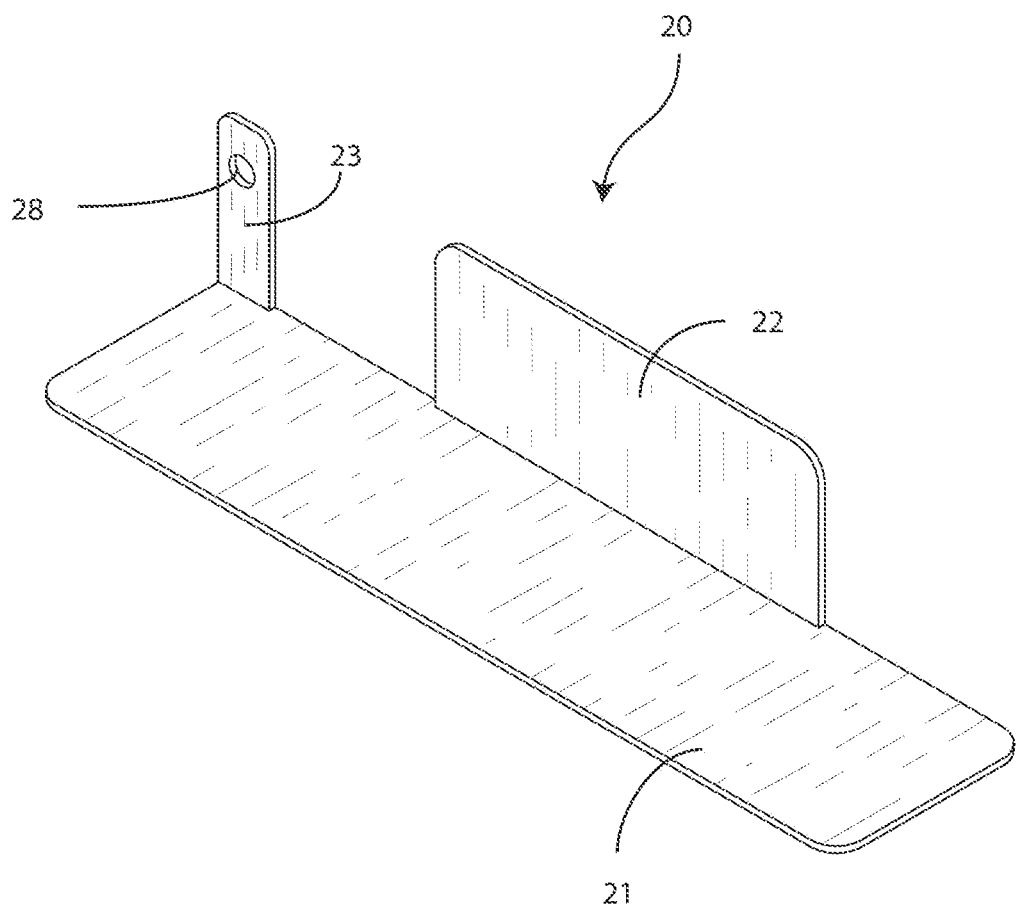
FIG. 1 is a top perspective view of an embodiment of the present invention.
Figure 2:
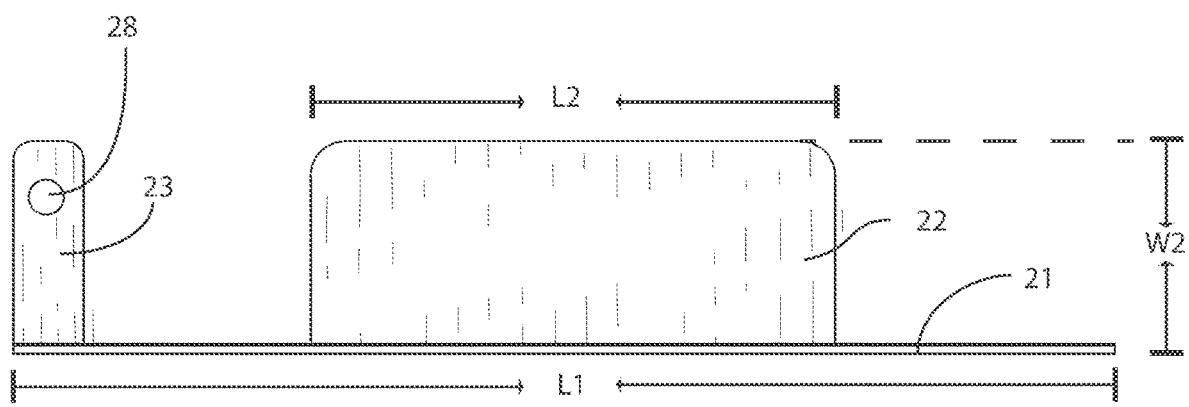
FIG. 2 is a front elevational view of the embodiment of FIG. 1.
Figure 3:
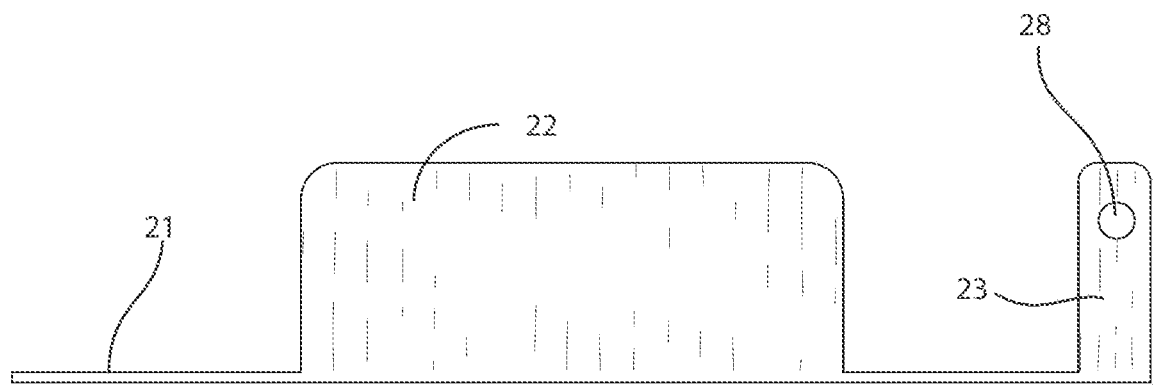
FIG. 3 is a rear elevational view of the embodiment of FIG. 1.
Figure 4:
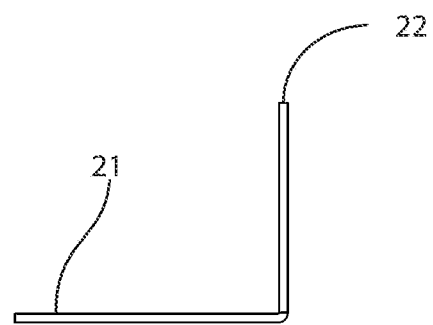
FIG. 4 is a right side elevational view of the embodiment of FIG. 1.
Figure 5:
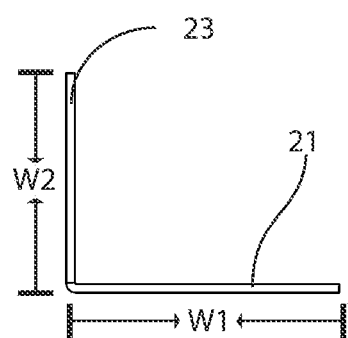
FIG. 5 is a left side elevational view of the embodiment of FIG. 1.
Figure 6:
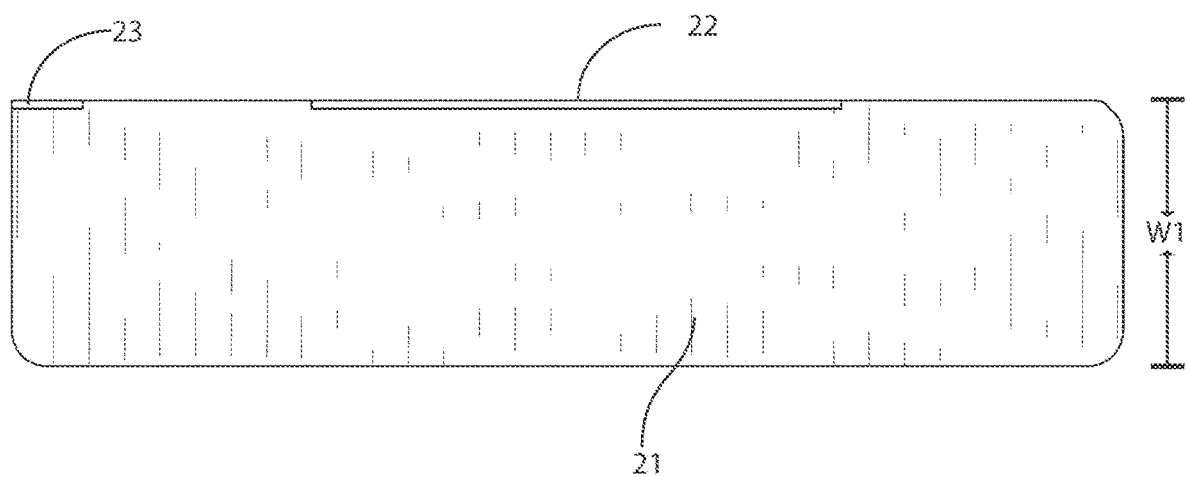
FIG. 6 is a top plan view of the embodiment of FIG. 1.
Figure 7:
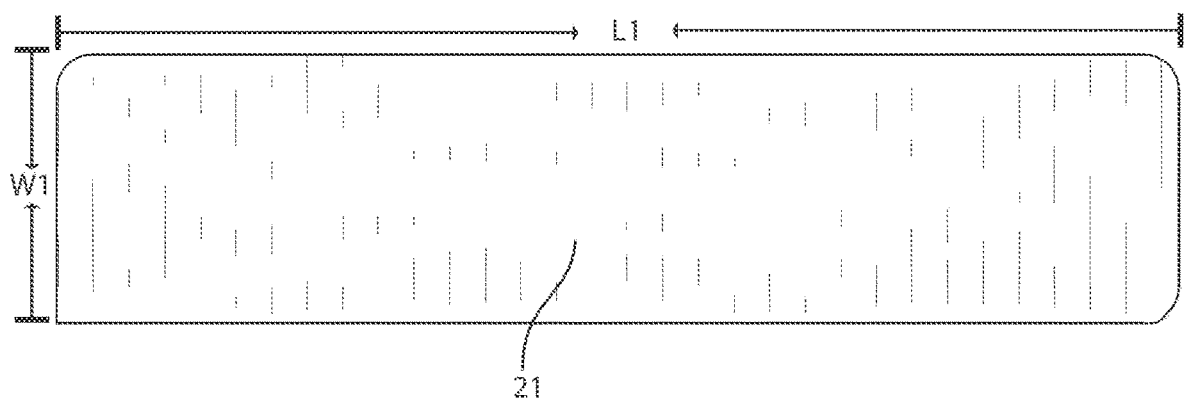
FIG. 7 is a bottom plan view of the embodiment of FIG. 1.
Figure 8:
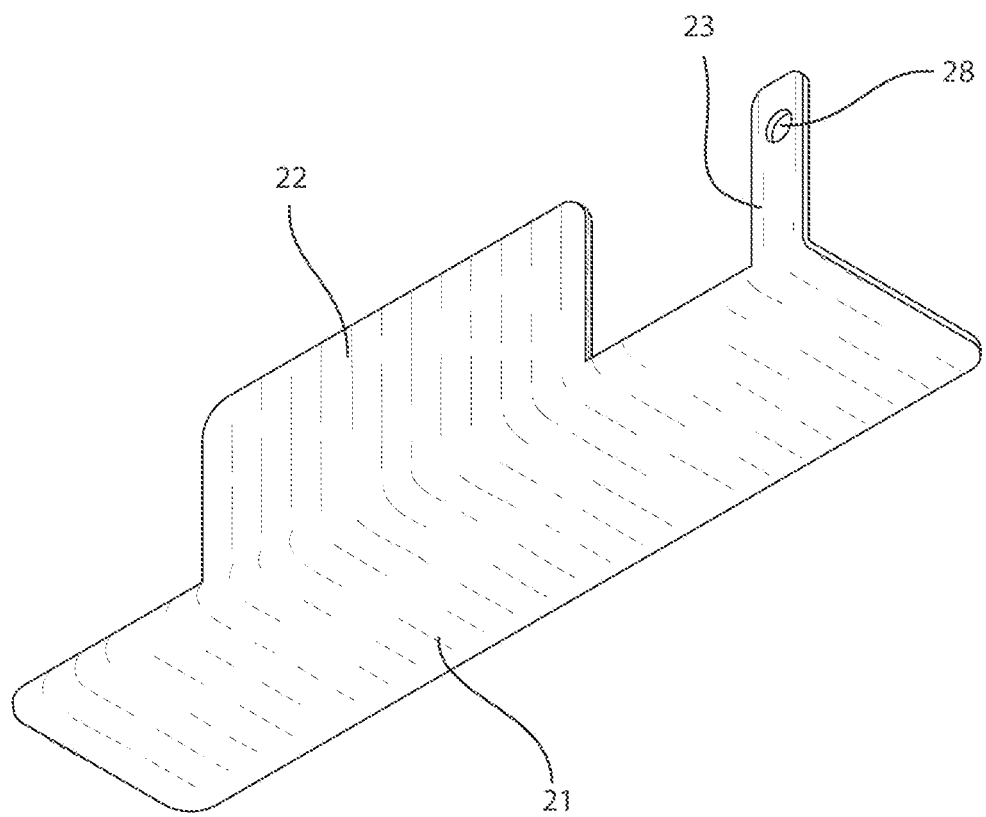
FIG. 8 is a bottom perspective view of the embodiment of FIG. 1.
Figure 9:
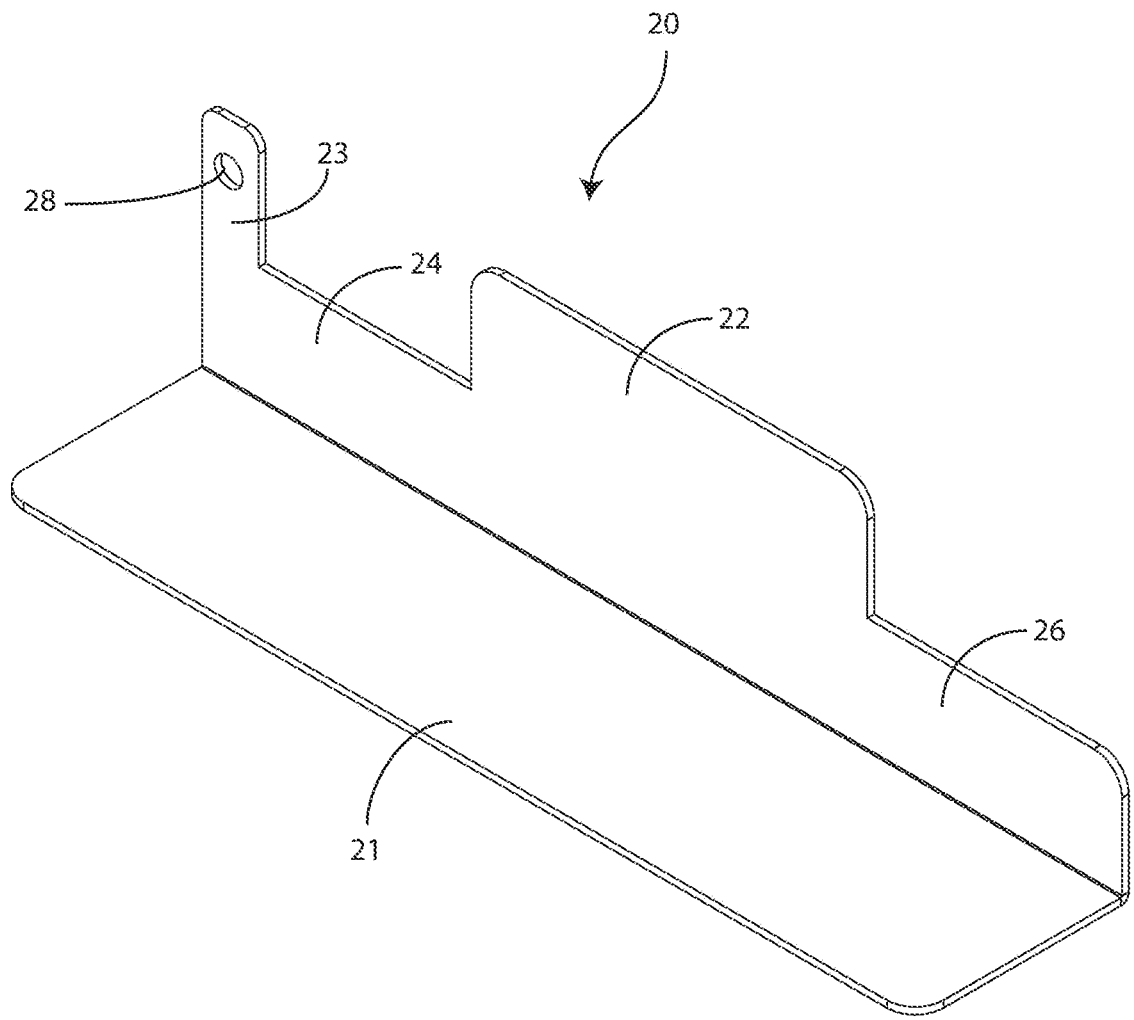
FIG. 9 is a top perspective view of an alternative embodiment of the present invention.
Figure 10:
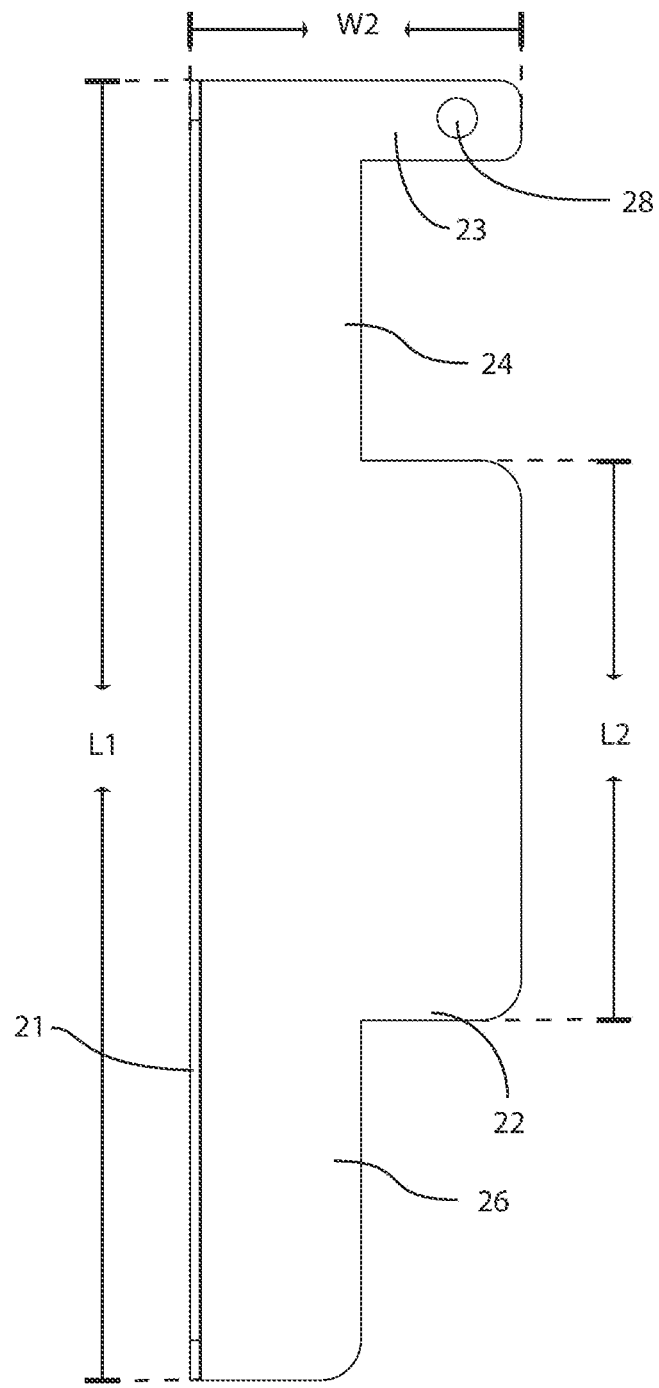
FIG. 10 is a front elevational view of the embodiment of FIG. 9.
Figure 11:
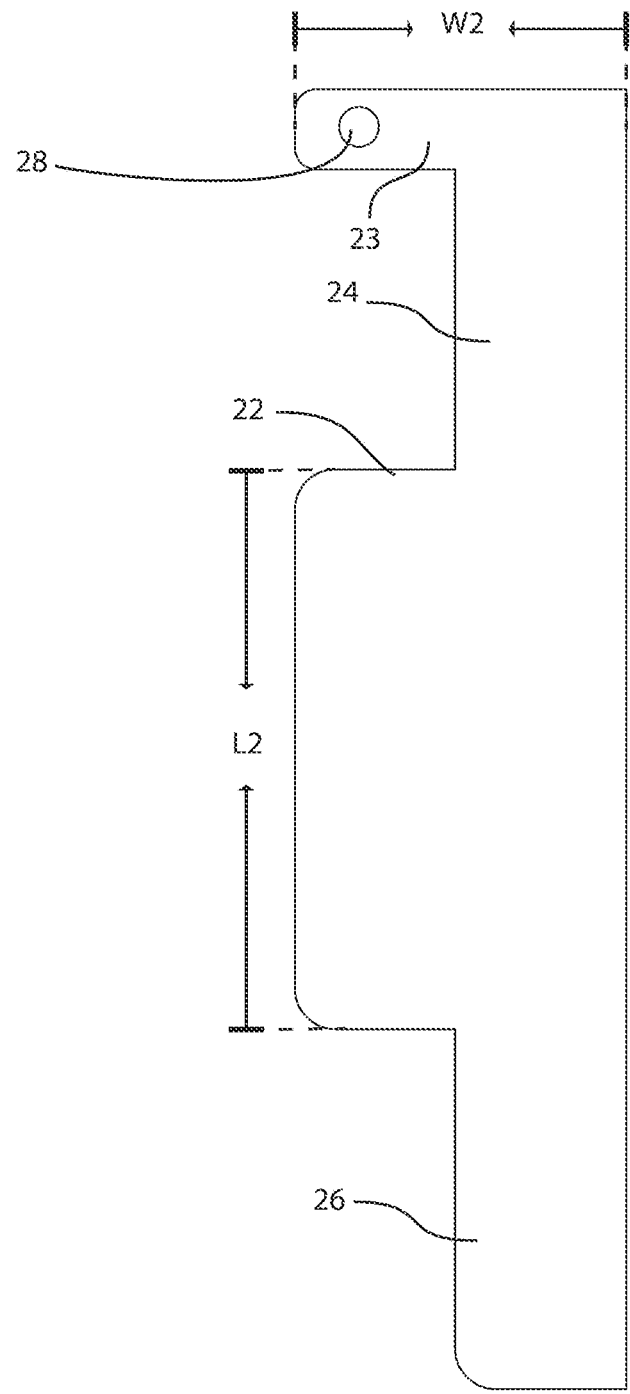
FIG. 11 is a rear elevational view of the embodiment of FIG. 9.
Figure 12:
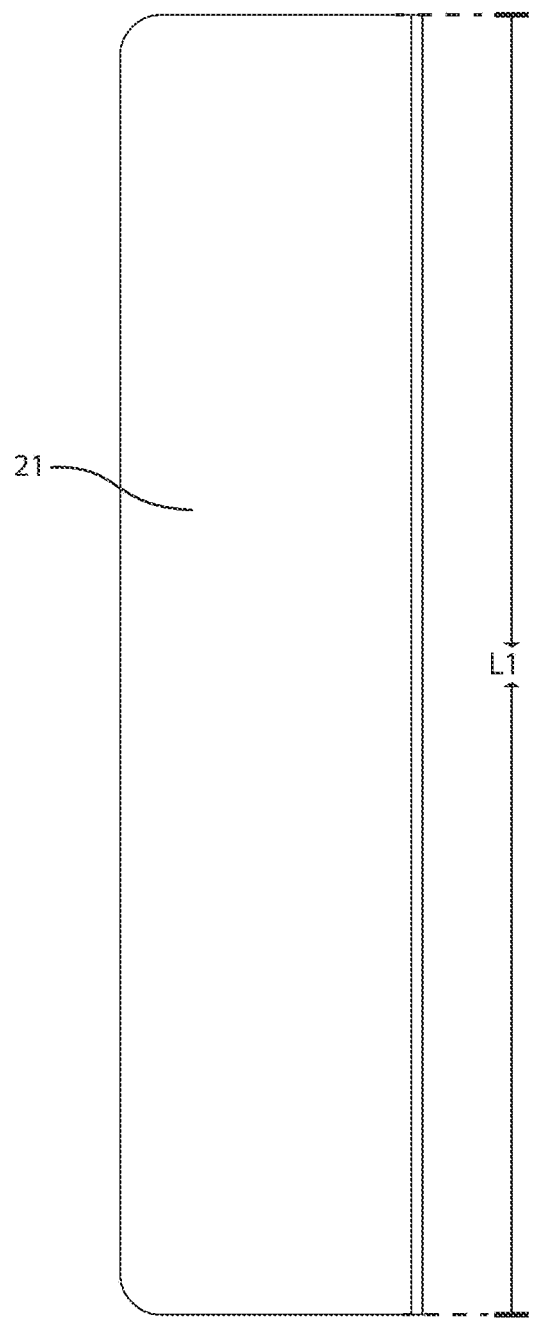
FIG. 12 is a bottom plan view of the embodiment of FIG. 9.
Figure 13:
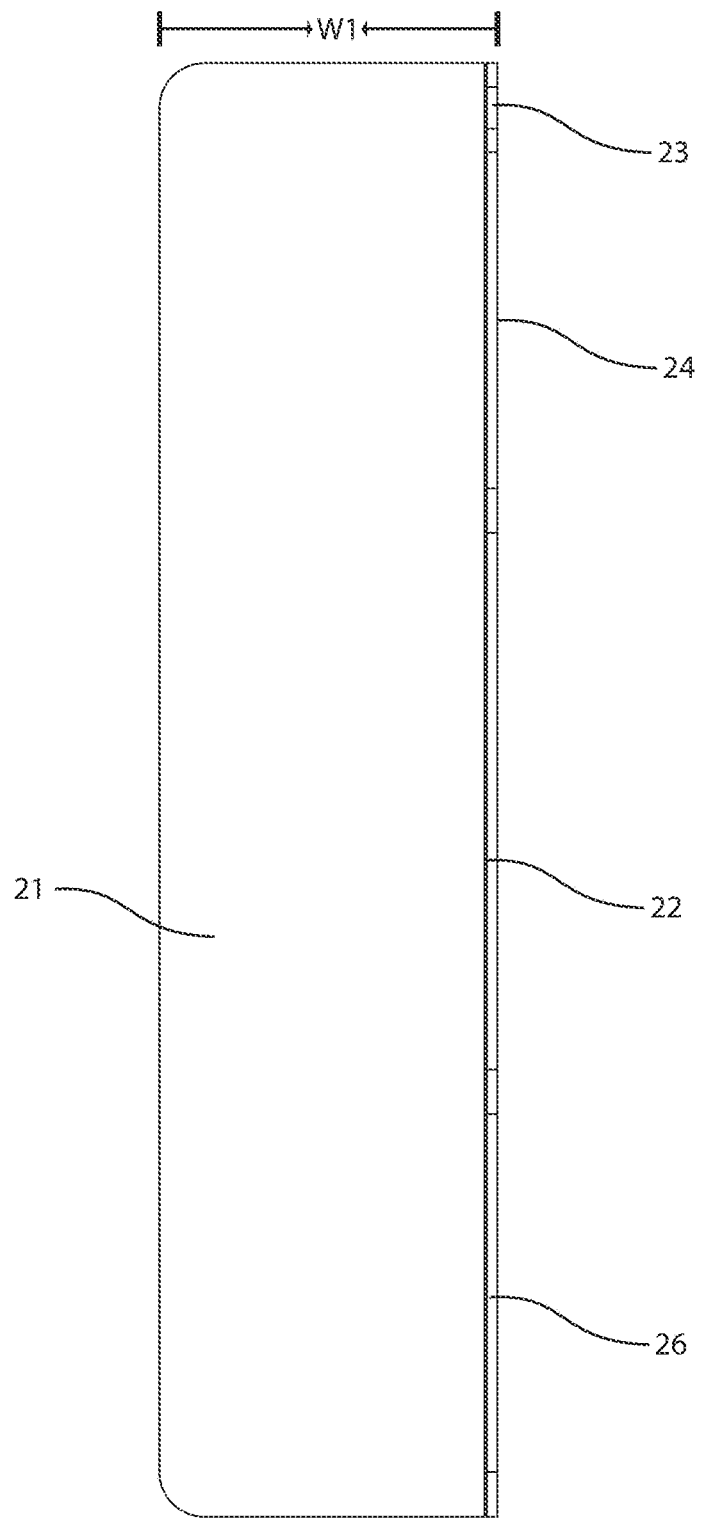
FIG. 13 is a top plan view of the embodiment of FIG. 9.
Figure 14:
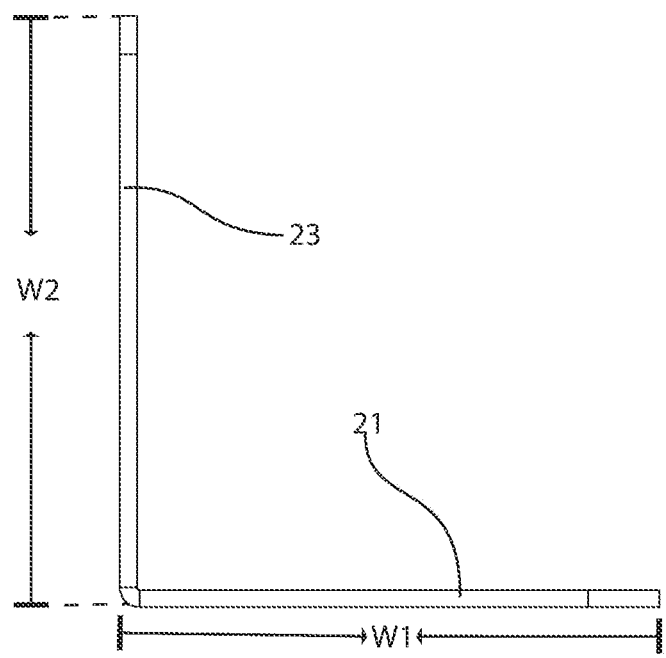
FIG. 14 is a right side elevational view of the embodiment of FIG. 9.
Figure 15:
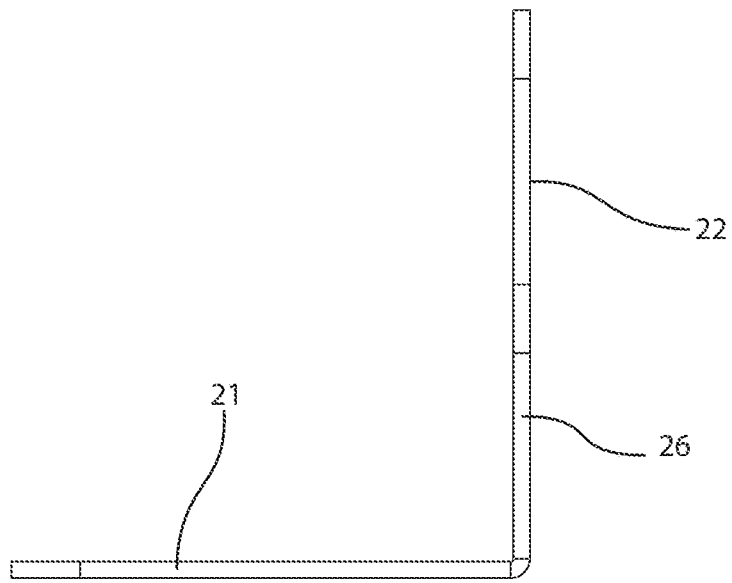
FIG. 15 is a left side elevational view of the embodiment of FIG. 9.
Figure 16:
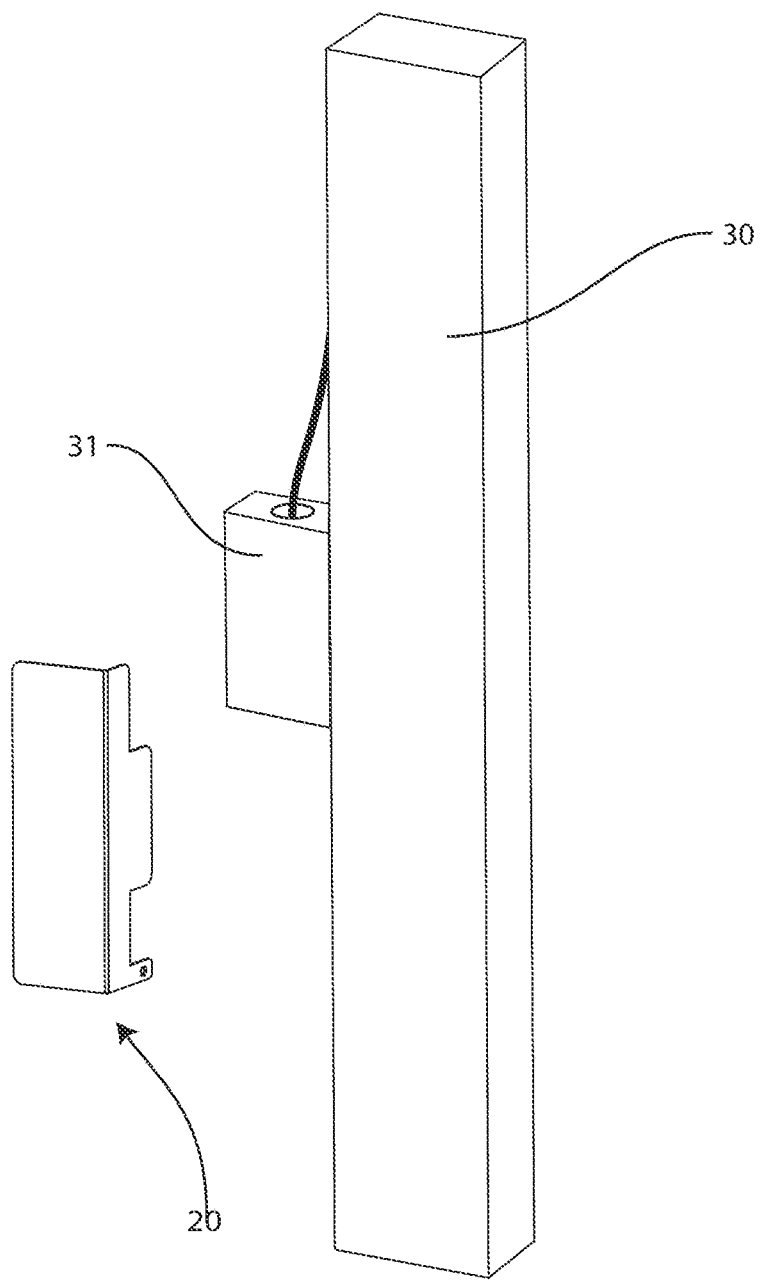
FIG. 16 is an environmental view of an electrical box attached to a wall frame member and an embodiment of the invention prior to engagement.

Referring to the drawings wherein like reference characters designate like or corresponding parts throughout the several views, and referring particularly to the exemplary embodiment of FIGS. 1-8, it is seen that this illustrated embodiment includes a bracket 20 having an L-shaped cross-section made up of a flat elongated base 21 and at least one flange 22 perpendicularly attached at an edge of the base. The brackets of the present invention are designed so that the at least one flange 22 may be inserted between an electrical box 31 and a frame member 30 to which the box 31 is attached such that base 21 fits against and covers the back of the box, protecting the box from punctures.

In the embodiment shown in FIGS. 1-8, a single flange 22 may be provided that extends along only a portion of an edge of base 21 in order to fit between mounting hardware 35 of an electrical box 31. See FIGS. 18-19. For example and without limitation, base 21 may have a length of eight inches, and flange 22 may have a length of 3.5 inches. In the illustrated embodiment of FIGS. 1-8, an additional optional flange 23 may be provided having an opening 28 therein for use in securing the flange to a frame member 30 using mounting hardware 25. See FIGS. 17A-19. It is to be appreciated that in other embodiments, a plurality of flanges 22 may be provided to fit between the mounting hardware 35 of the electrical box 31, and additional flanges 23 may be present to provide additional mounting openings 28 to secure the bracket 20 to a frame member 30.

In other embodiments, a single flange 22 may be provided that extends along the entire length of a longitudinal edge of base 21. In some of these embodiments, the width (W2) of flange 22 may be shallow (e.g., 1" wide) in order to avoid contact with mounting hardware 35 when inserted between the electrical box 31 and frame member 30. In other embodiments, such as the embodiment shown in FIGS. 9-15, a single flange 22 extending along the edge of base 21 may have indentations or recesses 24, 26 (e.g., indentations of ½" or 1") to accommodate and avoid contact with mounting hardware 35. In such embodiments, for example, the width W2 of the flange may be 1.5", whereas the width of the extensions may be only ½" or 1". Such a flange may also extend beyond the electrical box and include an opening 28 in this extension for mounting the bracket 20 to a frame member 30.

The lengths and widths of base 21 and flange 22 may be varied according to the size of the electrical box 31 to be protected. In most embodiments, the length L1 of base 21 should generally correspond to the height of the electrical box to be protected; and the width W1 of base 21 should generally correspond to the width of the electrical to be protected, in order to provide sufficient coverage of the back of the box for protection from punctures. For example, and without limitation, an electrical box containing one component (e.g. a single light switch) will have a narrow width and therefore requires a base 21 having a similarly narrow width (W1); whereas, a wider electrical box containing two, three or more components will require base 21 to have a wider width (W1) according to the wider size of the box. In most embodiments, no gaps or openings are provided in base 21 in order to provide complete protection against inadvertent punctures.

The width (W2) of flange 22 is first determined according to the depth of the electrical box to be protected, and should not be greater than the depth of the electrical box, and will usually be shorter. This allows base 21 to make contact with the back of the electrical box 31 when the bracket 20 is installed. The width (W2), length (L2), contour and/or positioning of flange 22 may also be determined by the position of mounting members (nails or screws) that hold an electrical box 31 to a frame member 30, in order that insertion of flange 22 between box 31 and frame member 30 is not impeded by these mounting members, and allowing base 21 to make contact with the back of the box 31. In the embodiment shown in FIGS. 1-8, flange 22 is extends along only a portion (e.g., 3.5") of an edge of base 21 (e.g., overall base edge length of 8") leaving room for box mounting members 35, for example, between one end of flange 22 and flange 23, and between the other end of flange 22 and the end of base 21. See FIGS. 18-19.

In some embodiments, flange 22 may extend along the entire length of base 21 as shown, for example, in FIGS. 9-15. In these embodiments, one or more indentations or gaps such as 24 and 26 may be provided to accommodate for the position(s) of the electrical box mounting members 35. It is to be appreciated that in some embodiments (not shown), multiple flanges 22 may be provided with gaps between them to accommodate the positions of different electrical box mounting members 35. In other embodiments (not shown), the overall width (W2) of flange 22 may be shorter (e.g. 1") but with no indentations, to accommodate electrical box mounting members 35 near the open front of the electrical box 31. Many electrical boxes provide standard positions for mounting nails or screws, such as those shown in FIGS. 18 and 19. As a result, in some embodiments the length L2 and number of flange(s) 22 may be pre-determined to fit between these mounting members 35; and in other embodiments the gaps or recesses (such as 24 and 26) may be pre-positioned to accommodate for these mounting members 35.

In some embodiments (not shown), flange 22 may extend along the entire length of base 21, and the widest width (W2) of flange 22 may not be longer than the distance (clearance) between the nail or screw that is closest to the back of the installed electrical box and the back of the box itself (e.g. ½", or 1", or 1.5"). In these embodiments, when flange 22 is inserted between the electrical box 21 and the frame member 30, base 21 may be in contact with the back of the box 21.

Figure 17A:
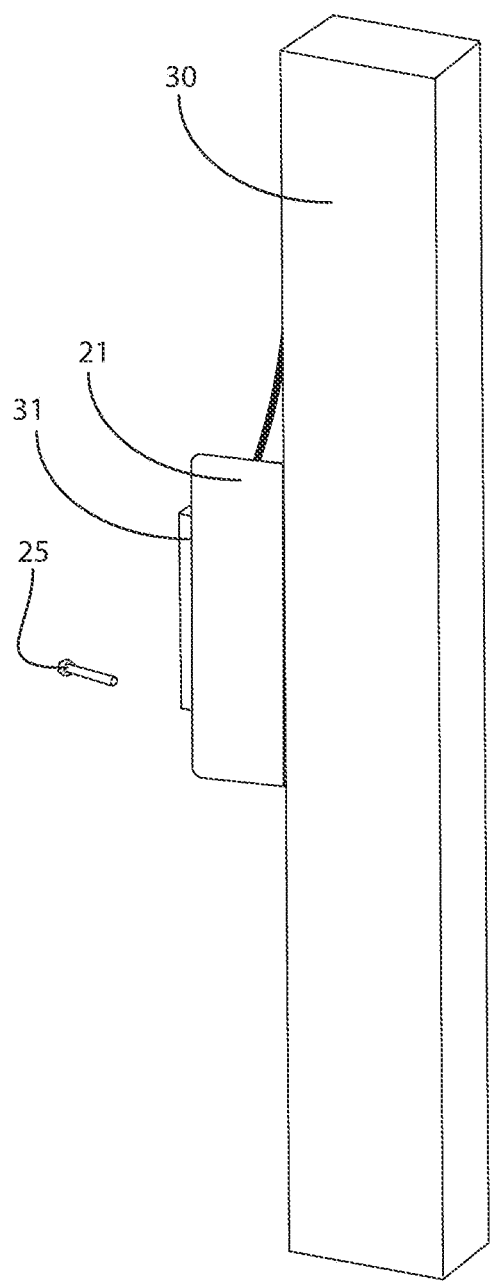
FIG. 17A is an environmental perspective view of an electrical box attached to a wall frame member with an embodiment of the invention engaged with the electrical box, and also showing an optional mounting member prior to attachment.
Figure 17B:
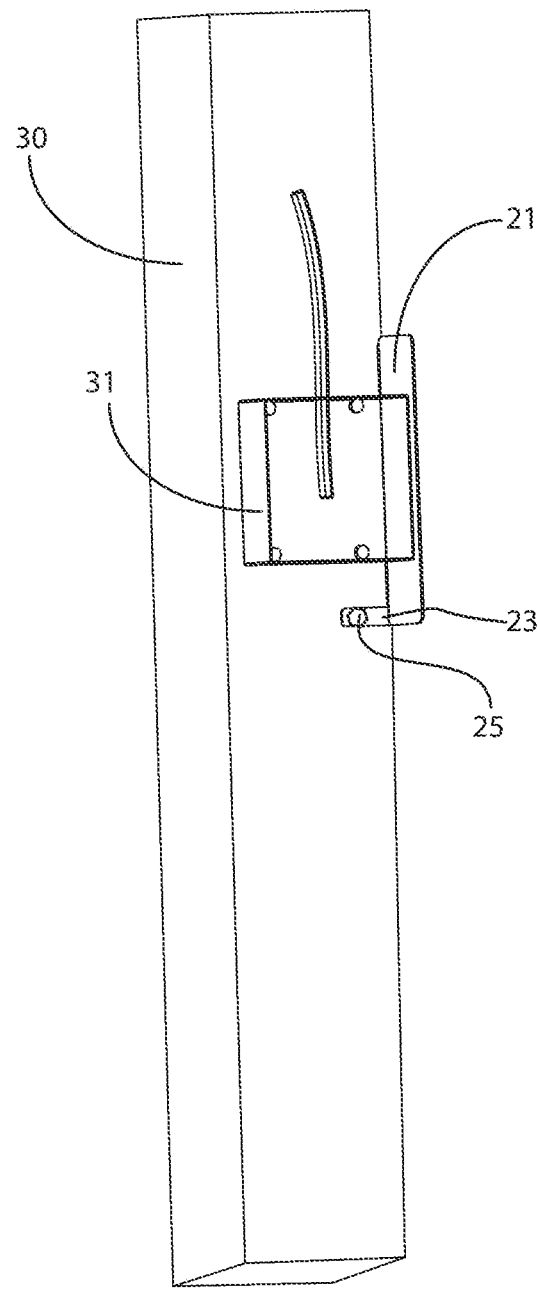
FIG. 17B is another environmental perspective view of an electrical box attached to a wall frame member with an embodiment of the invention engaged with the electrical box and with the wall frame member using the mounting member.

Once a bracket 20 is inserted between an electrical box 31 and a frame member 30, the bracket may be affixed to the same frame member 30 as the box by inserting a mounting member 25 (such as a nail or screw) into an opening 28 in bracket 20, as illustrated in FIG. 17B. Opening 28 may be provided in a separate flange 23 as shown, for example, in FIGS. 1-8; or opening 28 may be part of flange 22 itself, as shown, for example, in FIGS. 9-15. In alternative embodiments (not shown), additional openings 28 for additional mounting member 25 may be provided on flange 22 and/or flange 23.

Figure 18:
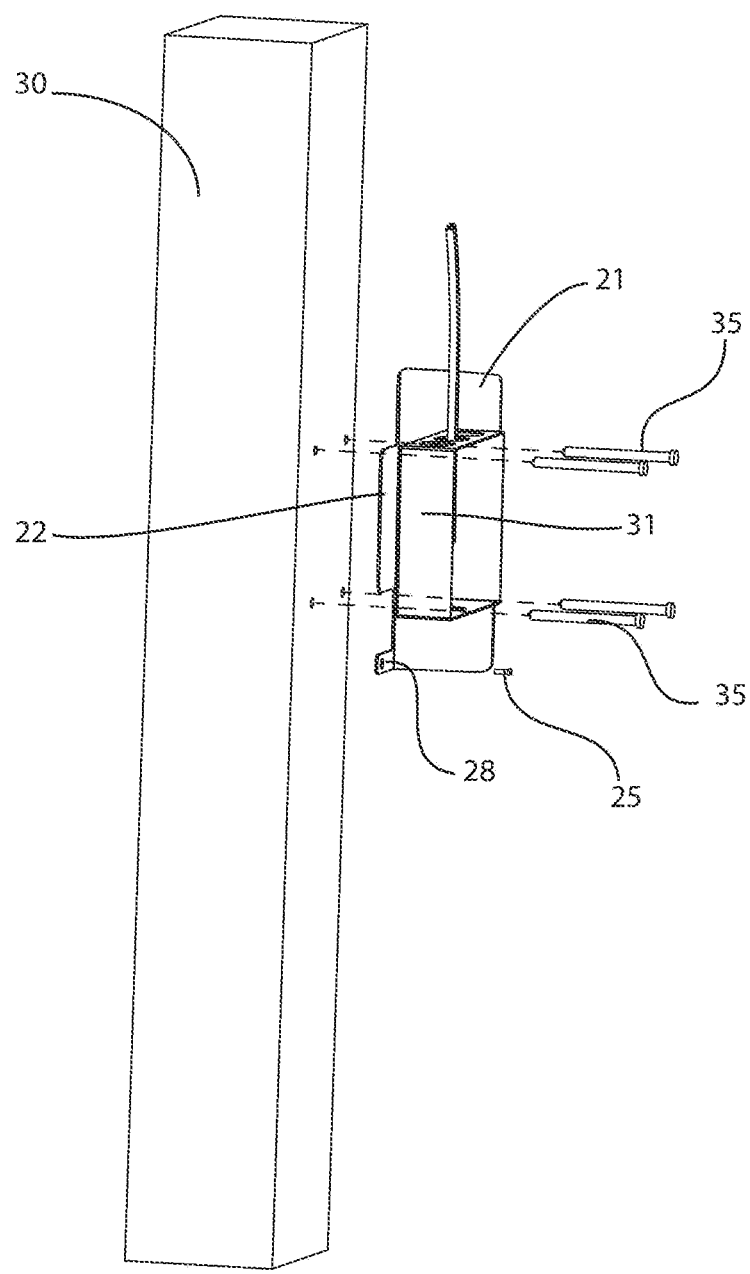
FIG. 18 is a partially exploded environmental perspective view showing the relative positions of an electrical box, a wall frame member, and an embodiment of the present invention prior to an installation.
Figure 19:
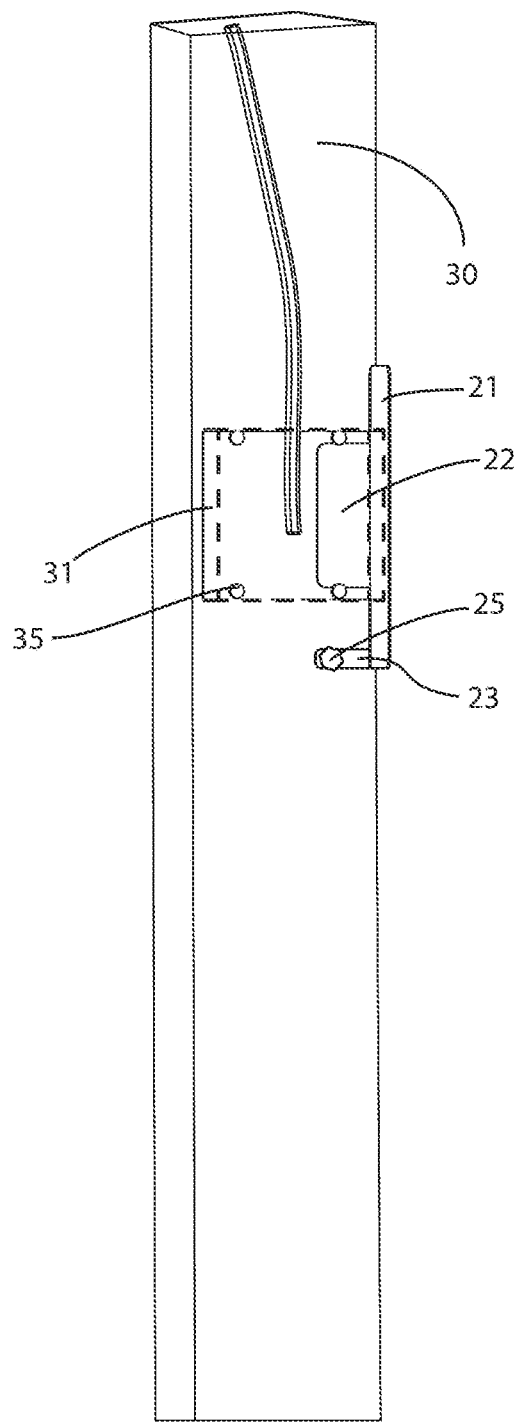
FIG. 19 another environmental perspective view of an electrical box attached to a wall frame member with an embodiment of the invention engaged with the electrical box and with the wall frame member using the mounting member.

In use, an electrical box 31 is attached to a wall frame member 30 using mounting members 35 such as screws or nails. A bracket 20 is then selected having a base 21 and at least one flange 22. The base should be wide enough to cover the back of the box 31, and the flange 22 should not make contact with the mounting members 35 when inserted in the space between the mounted electrical box 31 and the frame member 30. For example, and without limitation, the flange 22 may fit between the mounting members 35 (such as shown in FIGS. 18-19), or the flange may have gaps to accommodate the mounting members (FIG. 9), and/or the flange may have a shallow width. Once a bracket with an appropriately sized base 21 and flange(s) 22 is selected, the flange(s) 22 is then inserted in the space between the electrical box 31 and the frame member 30 such that base 21 rests against the back of the electrical box 31. Ordinarily, the space between the electrical box 31 and the frame member 30 is tight, and will provide sufficient friction to hold flange securely 22 in place without more. However, in some situations there may be a gap between the electrical box 31 and the frame member 30. As a result, in alternative embodiments, flange(s) 22 or 23 may be provided with one or more openings 28 through which one or more mounting members 25 (such as screws or nails) may be engaged to secure bracket 20 against frame 30. Once the bracket 20 is installed, the sheetrock, drywall or wallboard may be installed behind the electrical box 31.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein, and that different combinations of the features of the illustrated embodiments may be used in other embodiments, all within the scope of the invention. The illustrated embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

The invention claimed is:

1. An apparatus for protecting an electrical box comprising: a flat generally rectangular base member and at least one flat flange member perpendicularly attached to at least a portion of a longitudinal edge of said base member forming an L-shaped bracket wherein said at least one flange member is operable for frictional insertion between an electrical box and a wall frame member after the electrical box has been attached to the wall frame member, the flange member being shaped so as to avoid contact with mounting hardware holding the electrical box against the wall frame member when said flange is inserted between said electrical box and said wall frame member.

2. The apparatus of claim 1 further comprising a second flat flange member perpendicularly attached to a different portion of said longitudinal edge of said base.

3. The apparatus of claim 2 wherein said second flange member includes at least one opening for receiving a mounting member.

4. The apparatus of claim 3 wherein said mounting member is a nail or a screw.

5. The apparatus of claim 1 wherein said flange member extends along the entire longitudinal edge of said base member.

6. The apparatus of claim 5 wherein at least one recess is provided in said flange member to avoid contact with said electrical box mounting hardware.

7. The apparatus of claim 6 wherein said flange includes an extension at one end and wherein said extension includes at least one opening for receiving a mounting member.

8. The apparatus of claim 1 wherein said base member and at least one flat flange member are formed from a single piece of flat metal.

9. A method for protecting an electrical box from outside impacts comprising the steps of:
   a. attaching an electrical box to a building frame member using mounting hardware;
   b. selecting an L-shaped bracket having a flat generally rectangular base member and at least one flat flange member perpendicularly attached to at least a portion of a longitudinal edge of said base member wherein said at least one flange is shaped so as to avoid contact with said mounting hardware holding said electrical box against said wall frame member when said flange is frictionally inserted between said electrical box and said wall frame member; and
   c. inserting said at least one flange between said electrical box and said wall frame member for frictional engagement such that said base comes into contact with a back surface of said electrical box it.

10. The method of claim 9 wherein said at least one flange comprises two flanges, and a second of said flanges includes at least one opening therein, and comprising the additional step of inserting a mounting member through said opening in said second flange to attach said bracket to said wall frame member.

11. The method of claim 9 wherein said at least one flange member extends along the entire longitudinal edge of said base member.

12. The apparatus of claim 11 wherein at least one recess is provided in said flange member to avoid contact with said electrical box mounting hardware.

13. The apparatus of claim 12 wherein said at least one flange includes an extension at an end thereof and wherein said extension includes at least one opening for receiving a mounting member, and comprising the additional step of inserting a mounting member through said opening to attach said bracket to said wall frame member.

14. The apparatus of claim 9 wherein said base member and at least one flat flange member are formed from a single piece of flat metal.

15. An apparatus for protecting an electrical box that has been attached to a wall frame member using mounting hardware, the apparatus comprising:
   a flat generally rectangular base member and at least one flat flange member perpendicularly attached to at least a portion of a longitudinal edge of said base member forming an L-shaped bracket, wherein said at least one flange member is operable for frictional engagement between the electrical box and the wall frame member without the use of fasteners when the flange is inserted between the electrical box and the wall frame member, and wherein the flange member is shaped so as to avoid contact with the mounting hardware when the flange is inserted between the electrical box and the wall frame member.

16. The apparatus of claim 15 wherein said flange member extends along the entire longitudinal edge of said base member.

17. The apparatus of claim 16 wherein at least one recess is provided in said flange member to avoid contact with said electrical box mounting hardware.

18. The apparatus of claim 15 wherein said flange includes an extension at one end and wherein said extension includes at least one opening for receiving a mounting member.

* * * * *